US009160027B2

(12) United States Patent
Ono (10) Patent No.: US 9,160,027 B2
(45) Date of Patent: Oct. 13, 2015

(54) FUEL CELL BUNDLE AND FUEL CELL MODULE COMPRISING SAME

(75) Inventor: Takashi Ono, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 69 days.

(21) Appl. No.: 13/812,837

(22) PCT Filed: Jul. 29, 2011

(86) PCT No.: PCT/JP2011/067541
§ 371 (c)(1),
(2), (4) Date: Jan. 28, 2013

(87) PCT Pub. No.: WO2012/015051
PCT Pub. Date: Feb. 2, 2012

(65) Prior Publication Data
US 2013/0122387 A1    May 16, 2013

(30) Foreign Application Priority Data
Jul. 29, 2010   (JP) .................... 2010-170741

(51) Int. Cl.
*H01M 8/24*   (2006.01)
*H01M 8/02*   (2006.01)
*H01M 8/12*   (2006.01)

(52) U.S. Cl.
CPC ................ *H01M 8/249* (2013.01); *H01M 8/02* (2013.01); *H01M 8/243* (2013.01); *H01M 8/2465* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

2010/0119906 A1    5/2010   Ono

FOREIGN PATENT DOCUMENTS

| JP | 01-170954 | 12/1989 |
|----|-----------|---------|
| JP | 2003282127 A | 10/2003 |
| JP | 2004-281094 | 10/2004 |
| JP | 2006-236625 | 9/2006 |
| JP | 2007035498 A | 2/2007 |

(Continued)

OTHER PUBLICATIONS

Machine Translation of JP2007-134230 obtained from the JPO website on May 30, 2014.*
Machine Translation of JP2007-173115 obtained from the JPO website on May 30, 2014.*

(Continued)

*Primary Examiner* — Patrick Ryan
*Assistant Examiner* — Wyatt McConnell
(74) *Attorney, Agent, or Firm* — Volpe and Koenig, P.C.

(57) ABSTRACT

A fuel cell bundle includes a plurality of columnar fuel cell stacks extending in a first direction that are disposed spaced apart so that side surfaces thereof face each other, the fuel cell stacks each having a first gas flow channel along the first direction and also having a plurality of series-connected fuel cells disposed side-by-side in a second direction intersected by the first direction; a connecting member for electrically connecting series-connected fuel cells of a fuel cell stack with series-connected fuel cells of a fuel cell stack adjacent thereto; and a second gas flow channel regulating member for forming a second gas flow channel along the first gas flow channel between itself and the connecting member, the connecting member and the second gas flow channel regulating member being disposed between the adjacent fuel cell stacks.

10 Claims, 7 Drawing Sheets (56) References Cited

FOREIGN PATENT DOCUMENTS

| | | |
|---|---|---|
| JP | 2007-128739 | 5/2007 |
| JP | 2007-134230 | 5/2007 |
| JP | 2007149510 A | 6/2007 |
| JP | 2007173115 A | 7/2007 |
| JP | 2009004251 A | 1/2009 |

OTHER PUBLICATIONS

Japanese language office action dated Feb. 4, 2014 and its English language Statement of Relevance of Non-English References Pursuant to 37 CFR 1.98(a)(3)(i) cites the foreign patent documents listed above.

Extended European search report dated Jul. 17, 2014 issued in corresponding European application 11812640.8.

* cited by examiner

FUEL CELL BUNDLE AND FUEL CELL MODULE COMPRISING SAME

TECHNICAL FIELD

The present invention relates to a fuel cell bundle and a fuel cell module comprising the fuel cell bundle.

BACKGROUND ART

In recent years, as a next-generation energy source, there has been proposed a fuel cell bundle constructed by electrically connecting, via a connecting member, a plurality of fuel cell stacks together, each of which is composed of a plurality of fuel cells connected to each other.

As such a fuel cell stack, there is known a fuel cell stack composed of a plurality of fuel cells electrically connected to each other via an interconnector. The fuel cell is constructed by placing a fuel electrode, a solid electrolyte, and an air electrode successively in the order named on a side surface of an electrical insulating support. Moreover, there is known a fuel cell bundle composed of a plurality of staggered fuel cell stacks, in which the adjacent fuel cell stacks are electrically connected to each other via a connecting member (refer to Patent Literature 1).

CITATION LIST

Patent Literature

Patent Literature 1: Japanese Unexamined Patent Publication JP-A 2007-134230

SUMMARY OF INVENTION

Technical Problem

However, as is the case with Patent Literature 1 as above described, even if the fuel cell stacks are arranged in a staggered configuration to feed a large quantity of reaction gas in between the fuel cell stacks, the reaction gas fed in between the adjacent fuel cell stacks flows sideward from between the fuel cell stacks, and consequently an adequate quantity of reaction gas cannot be efficiently fed to the fuel cells constituting the fuel cell stack, which makes it difficult to enhance the power-generation efficiency of the fuel cell bundle.

Accordingly, an object of the invention is to provide a fuel cell bundle capable of efficient supply of an adequate quantity of reaction gas to a fuel cell stack, and a fuel cell module comprising the fuel cell bundle.

Solution to Problem

A fuel cell bundle pursuant to the invention comprises: a plurality of columnar fuel cell stacks extending in a first direction that are disposed spaced apart so that side surfaces thereof face each other, the fuel cell stacks each having a first gas flow channel along the first direction and also having a plurality of series-connected fuel cells disposed side-by-side in a second direction intersected by the first direction; a connecting member for electrically connecting series-connected fuel cells of a fuel cell stack with series-connected fuel cells of a fuel cell stack adjacent thereto; and a second gas flow channel regulating member for forming a second gas flow channel along the first gas flow channel between itself and the connecting member, the connecting member and the second gas flow channel regulating member being disposed between the adjacent fuel cell stacks.

A fuel cell module pursuant to the invention comprises a housing and the above-described fuel cell bundle contained in the housing.

Advantageous Effects of Invention

According to the invention, an adequate quantity of reaction gas can be fed to fuel cells constituting a fuel cell stack, which results in improvement in power-generation output of a fuel cell bundle.

BRIEF DESCRIPTION OF DRAWINGS

FIG. 7 shows the fuel cell stacks arranged adjacent to each other, wherein FIG. 7(a) is an explanatory drawing showing the fuel cell bundle of a fourth embodiment in which the fuel cells disposed on the confronting side surfaces of the adjacent fuel cell stacks are arranged so that the fuel cells are in offset relation to one another, and FIG. 7(b) is an explanatory drawing showing the fuel cell bundle of a fifth embodiment in which the fuel cells disposed on the confronting surfaces of the adjacent fuel cell stacks are arranged in a face-to-face manner.

DESCRIPTION OF EMBODIMENTS

Figure 1:
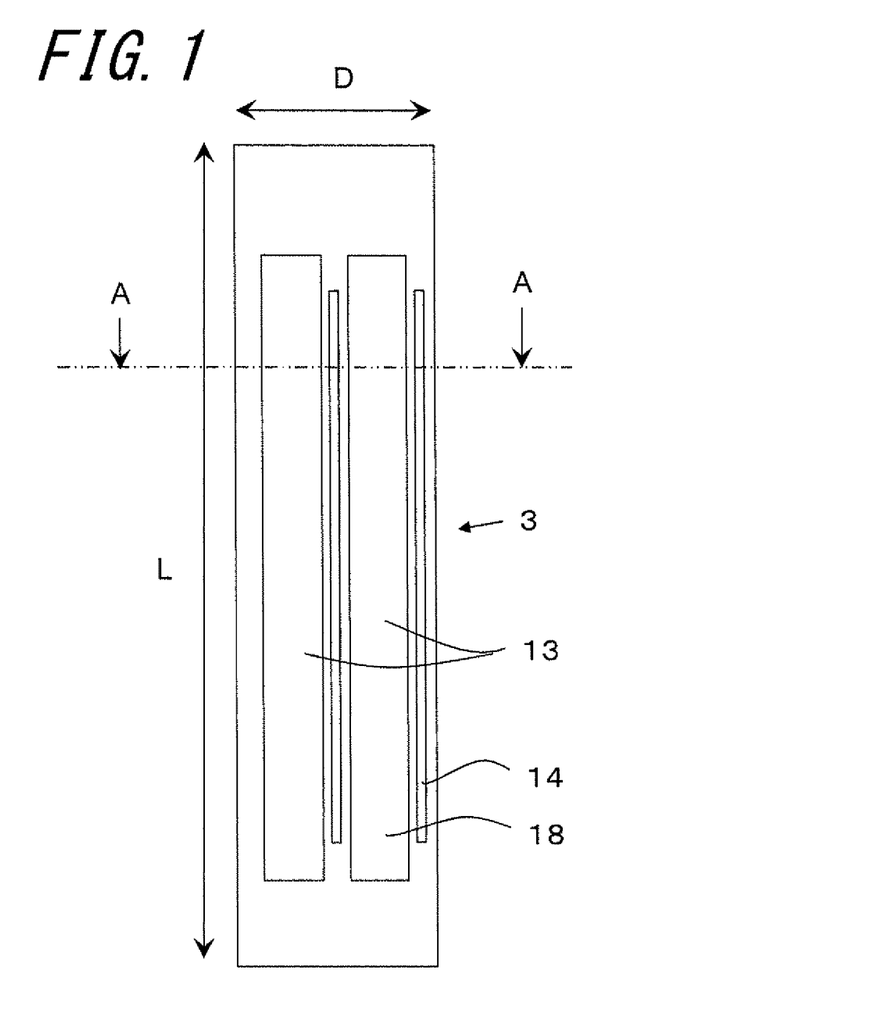
FIG. 1 is a front view showing a fuel cell stack constituting a fuel cell bundle.
Figure 2:
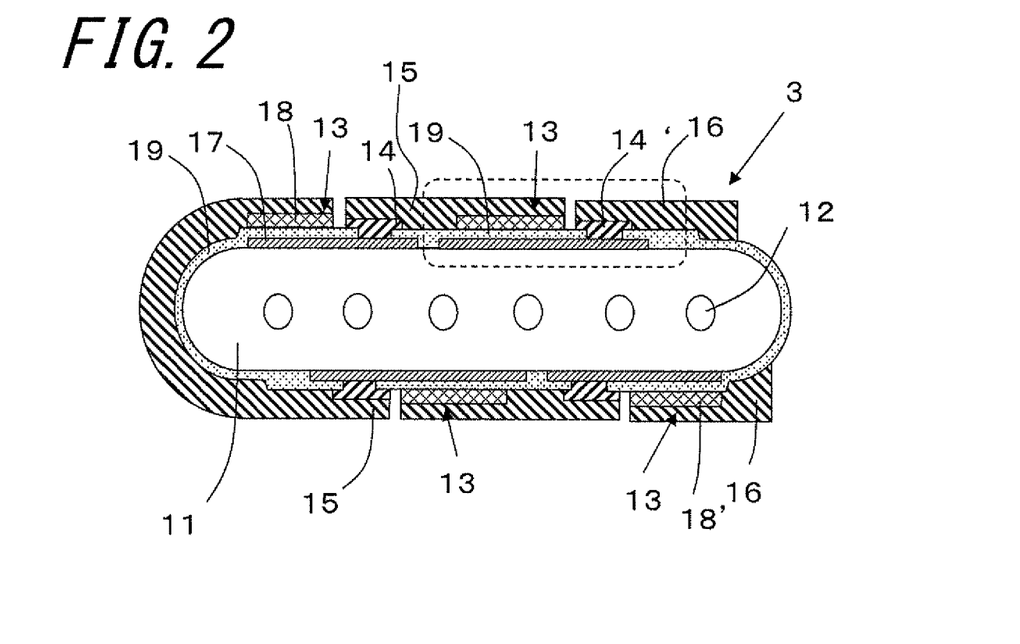
FIG. 2 is a cross-sectional view of the fuel cell stack taken along the line A-A shown in FIG. 1.

A fuel cell stack 3 for use in a fuel cell bundle will be described with reference to FIGS. 1 and 2. Note that, in FIG. 1, the illustration of a cell-to-cell connecting member is omitted. In FIGS. 1 to 8, for the purpose of simplifying an understanding of the construction, there may be cases where the thickness, length, width, etc. thereof are represented on an enlarged or reduced scale.

In FIGS. 1 and 2, the fuel cell stack 3 has the form of a column extending in a first direction, and is constructed by forming, on the side surface of a support 11 having the form of a slim hollow plate, a plurality of rectangular-shaped fuel cells 13 along the lengthwise direction of the support 11 in a manner such that they are arranged in a second direction intersected by the first direction. Therefore, the lengthwise direction of the fuel cell stack 3 defines the first direction. Note that, in FIG. 2, the support 11 is shown in section, but a hatching is omitted. Moreover, the first direction and the second direction do not necessarily have to be perpendicular to each other.

In this configuration, there are provided two fuel cells 13 at one of the side surfaces of the hollow plate-shaped support 11 and two fuel cells 13 at the other one of the side surfaces, or a total of four fuel cells 13 in all.

As shown in FIG. 1, the plurality of fuel cells 13 are each given the shape of a long and narrow rectangle having a long side and a short side as viewed from the front, and a direction in which the long side extends defines the lengthwise direction of the support 11. Adjacent long sides of the plurality of fuel cells 13 are opposed to each other. Since the lengthwise direction of the support 11 is equivalent to the first direction, it follows that the first direction will occasionally be referred to as the lengthwise direction of the support 11. Moreover, since the widthwise direction of the support 11 is equivalent to the second direction intersected by the first direction, it follows that the second direction will occasionally be referred to as the widthwise direction of the support 11.

As shown in FIG. 2, the support 11 has a pair of opposed flat side surfaces, and the side surfaces are connected to each other at their opposite edges by arcuate surfaces, thereby defining the shape of an elliptic cylinder. Inside the support 11, one or more (six, in the drawing) independent first gas flow channels 12, which are so formed as to penetrate from lengthwise one end to the other end of the support 11, are arranged in the lengthwise direction of the support plate 11 (a direction perpendicular to a plane of paper of FIG. 2). By passing a fuel gas (hydrogen gas) through the interior of the first gas flow channel 12 in a direction from lengthwise one end to the other end of the support plate 11, it is possible to feed the fuel gas to the fuel cells 13 disposed on each of the side surfaces of the support plate 11. The support 11 is made of an insulating material from the standpoint of preventing electrical shorting of the fuel cells 13.

It is noted that, in FIG. 1, the widthwise dimension D of the support 11 (equivalent to the distance between the arcuate surfaces at the opposite ends thereof) falls in the range of, for example, 15 mm to 80 mm, and preferably 30 mm to 80 mm. The lengthwise dimension L of the support 11 falls in the range of, for example, 100 mm to 300 mm, and preferably 150 mm to 250 mm.

Moreover, the support 11 is made to have a porous nature, and it is advisable that the open porosity thereof is greater than or equal to 25%, and preferably it is adjusted to fall in the range of 30% to 45%. This makes it possible to direct the fuel gas within the first gas flow channel 12 to the surface of a fuel electrode 17. Although FIG. 1 shows the fuel cell stack, the width D and the length L of the support 11 are indicated in FIG. 1.

The fuel cell 13 is constructed by stacking together the fuel electrode 17 serving as an inner electrode, a solid electrolyte 19, and an air electrode 18 serving as an outer electrode, and the part where the fuel electrode 17, the solid electrolyte 19, and the air electrode 18 are disposed in overlapping relation with one another functions as a power-generating section. The fuel cells 13 are disposed on the side surfaces of the support 11. The solid electrolyte 19 is provided with an opening extending along the lengthwise direction of the fuel cell 13, and an electrically conductive interconnector 14 is formed in the opening so as to be connected to the fuel electrode 17 disposed on the support 11. The interconnector 14 has the capability of taking electric current generated by one fuel cell 13 to the surface of the adjacent fuel cell 13.

The air electrode 18 of one fuel cell 13 and the interconnector 14 of the fuel cell 13 adjacent to said fuel cell 13 are connected to each other by a cell connecting member 15, and four fuel cells 13 are electrically connected in series to one another. In order to establish electrical connection between the fuel cell 13 at the top side of the support 11 and the fuel cell 13 at the back side of the support 11, in FIG. 2, the cell connecting member 15 is formed at the left-side arcuate surface. Moreover, in the fuel cell stack 3, the interconnectors 14, as well as the air electrodes 18, of the series-connected fuel cells 13 at the opposite ends are connected with a cell stack connecting member 16 for electrical connection with the adjacent fuel cell stack 3.

Figure 3:
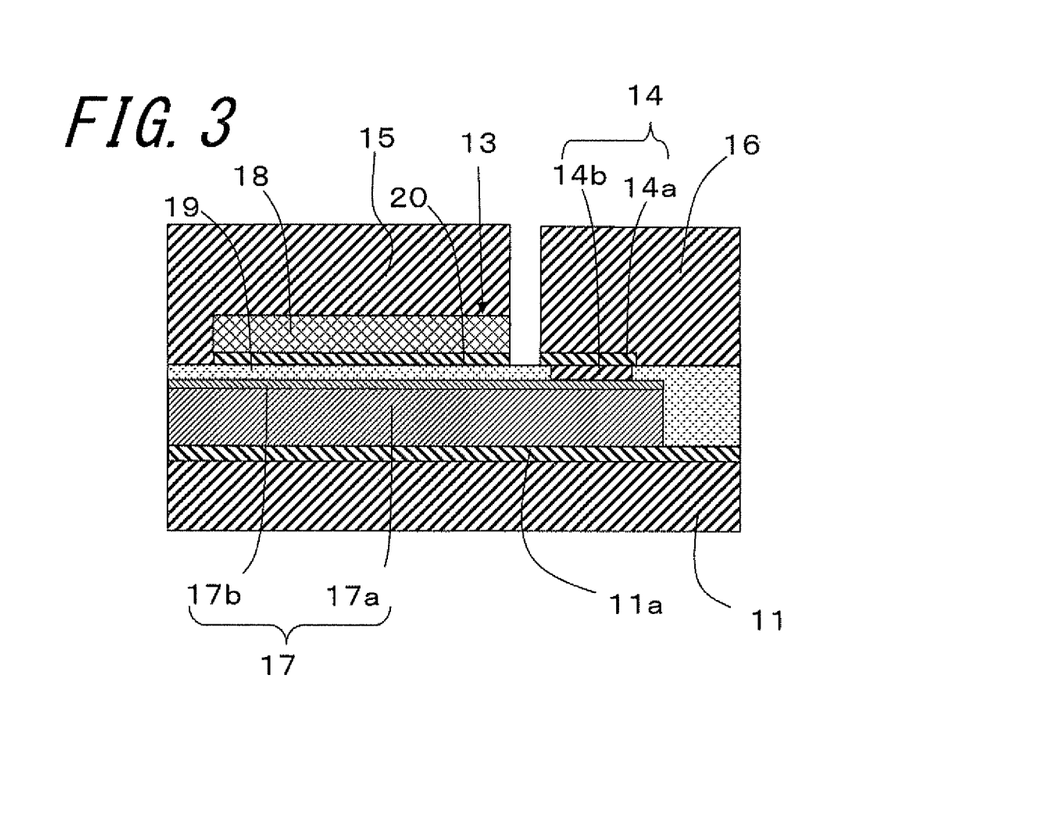
FIG. 3 is an enlarged sectional view showing the detailed structure of a fuel cell.

The detailed structure of the fuel cell 13 will be described with reference to FIG. 3. FIG. 3 is an enlarged sectional view showing the detailed structure of the fuel cell 13.

Over the entire surface of the support 11, there is formed a diffusion preventive layer 11a for preventing diffusion of the material used for the support. The fuel electrode 17 is formed thereon for hydrogen gas permeation in conformity to the shape of the fuel cell 13. In this embodiment, the fuel electrode 17 is composed of two layers, namely a power-collecting fuel electrode 17a and an active fuel electrode 17b.

On the fuel electrode 17, the solid electrolyte 19 is further formed. The solid electrolyte 19 is so formed as to cover the fuel electrode 17 and the support 11, with the exclusion of the opening for the installation of the interconnector 14 as will hereafter be described, and is also formed so as to lie in between the adjacent fuel cells 13. This helps reduce the possibility of leakage of the fuel gas flowing through the first gas flow channel 12 provided in the support 11.

The solid electrolyte 19 is provided with an opening extending in a direction along the long side of the fuel cell 13, and in this opening, the interconnector 14 for deriving electricity from the fuel electrode 17 is formed. In FIG. 3, the interconnector 14 has a two-layer structure composed of a metal layer 14a and a metallic glass layer 14b.

It is noted that, although the metallic glass layer 14b is used in the construction of FIG. 3, a heretofore known electrically conductive oxide material, for example, (La, Sr) $CrO_3$, (La, Sr)(Co,Fe) $O_3$, (La,Sr) $MnO_3$, or the like can be used instead of the metallic glass layer 14b.

Moreover, the air electrode 18 is formed on the solid electrolyte 19, with a reaction preventive layer 20 lying between them for preventing reaction between the air electrode 18 and the solid electrolyte 19. Positive and negative electricity of the fuel cell 13 is taken from the air electrode 18 and the interconnector 14, wherefore the air electrode 18 and the interconnector 14 are arranged out-of-contact with each other.

Further, the porous cell connecting member 15 is formed thereon. The cell connecting member 15 is an electrically conductive member for connecting the air electrode 18 of one fuel cell 13 and the interconnector 14 of the fuel cell 13 adjacent to said fuel cell 13. The cell connecting member 15 may either be of a single member extending along the lengthwise direction of the fuel cell 13 or be formed of a plurality of members for connecting a plurality of areas of the fuel cells 13. With the provision of the cell connecting member 15, the fuel cells 13 arranged successively from lengthwise one end to the other end of the support 11 can be electrically connected in series to each other.

On the fuel cell 13 located at the right side of the fuel cell stack 3, there is formed the porous cell stack connecting member 16 for electrical connection with the adjacent fuel cell stack 3. The cell stack connecting member 16 may be made of the same material as that used for the cell connecting member 15 as above described, and the fuel cell 13 situated on the right side of the first fuel cell stack 3 and the fuel cell 13 situated on the right side of the second fuel cell stack 3 can be electrically connected to each other via the cell stack connecting member 16 and a connecting member 21 which will hereafter be described.

It is noted that, as shown in FIG. 2, the fuel cell 13 disposed in the leftwardmost position on the upper surface of the support 11 and the fuel cell 13 disposed in the leftwardmost position on the lower surface of the support 11 can be electrically connected to each other by placing the cell connecting member 15 so as to run around the support periphery via the interconnector 14. These fuel cells 13 can, even if they are arranged on the upper and lower surfaces, respectively, of the support 11, be defined as being disposed in adjacent relation to each other in so far as they are connected together by the cell connecting member 15.

As described heretofore, in the fuel cell stack 3 of the above-described embodiment, the adjacent fuel cells 13 are electrically connected to each other by the cell connecting member 15. That is, the fuel electrode 17 of one fuel cell 13 is connected, through the interconnector 14, to the air electrode 18 of the other adjacent fuel cell 13 by the cell connecting member 15.

It is noted that, as shown in FIG. 2, an interconnector 14' of the fuel cell 13 at the right side of the support 11 acts as an electrode for making connection with the adjacent fuel cell stack 3. Moreover, as shown in FIG. 2, an air electrode 18' of the fuel cell 13 at the right side of the same support 11 acts as an electrode for making connection with the adjacent fuel cell stack 3. In order to connect those electrodes together, as will hereafter be described in detail, a connecting member (not shown) is formed.

In a fuel cell stack constructed by arranging a plurality of fuel cells in the lengthwise direction of a support as has been conventional, a fuel gas which is fed to a fuel cell located on the downstream side in the direction of fuel gas flow is used in a certain amount for power generation of a fuel cell located on the upstream side, which may result in fuel depletion in which the amount of the fuel gas for the downstream fuel cell becomes smaller than the amount of the fuel gas to be fed to the fuel cell 13 located on the upstream side in the direction of fuel gas flow.

On the other hand, in the fuel cell stack 3 thus far described, since the fuel cells 13 arranged on the side surface of the support 11 in a direction from one end to the other end thereof are, at their long sides, connected together in the widthwise direction of the support 11 by the cell connecting member 15 and the cell stack connecting member 16, it follows that the direction of current flow becomes substantially perpendicular to the lengthwise direction of the support 11, namely the direction of fuel gas flow. Accordingly, even if there arise fuel depletion in which the amount of gas to be fed to the downstream fuel cell 13 is decreased and ensuing reduction in the amount of power generation of the downstream fuel cell 13, the path of current flow can be secured in the fuel cell stack 3 as a whole. This makes it possible to eliminate the occurrence of an immediate decline in the power-generating capability of the whole, and thereby lengthen the service life of the fuel cell stack 3.

In the fuel cell stack 3, a fuel gas containing hydrogen is passed into the first gas flow channel 12 so that the support 11 is exposed to a reduction atmosphere, and also, as will hereafter be described in detail, an oxygen-containing gas such as air is passed over the surface of the air electrode 18 so that the air electrode 18 is exposed to an oxidation atmosphere, whereupon an electrode reaction occurs in the fuel electrode 17 and the air electrode 18, and a potential difference is applied between these electrodes, thereby allowing power generation.

Moreover, according to the fuel cell stack 3, since a plurality of fuel cells 13 are formed in a single fuel cell stack 3, it is possible to raise the voltage of power generation per fuel cell stack 3 depending on the number of the fuel cells. Therefore, a higher voltage can be obtained with a fewer number of the fuel cell stacks 3.

Further, since the support 11 has a plate-like shape and bears the fuel cells 13 on both side surfaces, it is possible to increase the area of the fuel cell 13 per volume of the fuel cell stack 3, and thereby increase the amount of power generation per volume of the fuel cell stack 3. Therefore, the number of the fuel cell stacks 3 required to obtain the necessary amount of power generation can be reduced. This results in structural simplification, ease of assembly, and improvement in the reliability of the fuel cell stack 3.

Hereinafter, the material and composition of the fuel cell stack 3 will be described.

The following is an example of the composition of the support 11. The support 11 contains 6 to 22 mol % of Ni in NiO equivalent, 5 to 15 mol % of Y and/or Yb in $Y_2O_3$ or $Yb_2O_3$ equivalent, and 68 to 84 mol % of Mg in MgO equivalent. The aim of such a composition is a reduction in the difference in the degree of shrinkage between the support and the solid electrolyte 19, which helps prevent cracking of the solid electrolyte 19.

The power-collecting fuel electrode 17a, which functions mainly to pass generated electric current through the interconnector 14, the cell connecting member 15, and the cell stack connecting member 16, is made of porous electrically conductive cermet. The porous electrically conductive cermet is composed for example of Ni and rare-earth element oxide. $Y_2O_3$ and $Yb_2O_3$ are particularly desirable for use as the rare-earth element oxide.

The active fuel electrode 17b is made of porous electrically conductive cermet. The porous electrically conductive cermet is composed for example of $ZrO_2$ having a rare-earth element dissolved in a solid state therein (stabilized zirconia) and Ni and/or Ni oxide (such as NiO). Moreover, as the stabilized zirconia, the same material as that used for the solid electrolyte 19 can be used.

In the active fuel electrode 17b, the proportion of stabilized zirconia (including partially-stabilized zirconia) to be blended preferably falls in the range from 35% to 65% by volume with respect to the total volume of the active fuel electrode 17b, and the proportion of Ni and/or Ni oxide to be blended preferably falls in the range of 35% to 65% by volume with respect to the total volume of the active fuel electrode 17b. Moreover, the active fuel electrode 17b has an open porosity of, for example, greater than or equal to 15%, or an open porosity in the range of 20% to 40%, and the thickness of the active fuel electrode 17b falls in the range of, for example, 1 μm to 100 μm in the interest of good power-collecting capability.

The solid electrolyte 19 is formed of dense ceramics made of stabilized zirconia $ZrO_2$ having a rare-earth element or its oxide dissolved in a solid state therein. Examples of the rare-earth element or its oxide to be contained in the form of solid solution include Sc, Y, La, Ce, Pr, Nd, Pm, Sm, Eu, Gd, Tb, Dy, Ho, Er, Tm, Yb, Lu, and oxides thereof. The use of Y, Yb, or oxides thereof helps reduce the cost of raw materials.

Concrete examples of the material used for the solid electrolyte 19 include stabilized zirconia $ZrO_2$ having 8% by mole of Y dissolved in a solid state therein (8 mol % Yttria Stabilized Zirconia, which will hereafter be referred to simply as "8YSZ") and also a lanthanum gallate-based ($LaGaO_3$-based) solid electrolyte which is substantially equal in the degree of shrinkage to 8YSZ.

The solid electrolyte 19 is designed to have a thickness in the range of 10 μm to 100 μm for example, and have a relative density according to the Archimedes' method of greater than or equal to 93%, and preferably a relative density of greater than or equal to 95% for example.

Such a solid electrolyte 19 serves as an intermediary electrolyte for the transfer of electrons between the electrodes, and has gas shut-off property for the prevention of leakage of a fuel gas or oxygen-containing gas (gas permeation).

The air electrode 18 is made of porous electrically conductive ceramics. Examples of electrically conductive ceramics include $ABO_3$-type perovskite oxide. Examples of such perovskite oxide include transition metal-type perovskite oxide, and preferably transition metal-type perovskite oxide having La in the A-site such as $LaMnO_3$-based oxide, $LaFeO_3$-based oxide, and $LaCoO_3$-based oxide. $LaCoO_3$-based oxide is particularly desirable because of its providing high electrical conductivity at a relatively low temperature of about 600° C. to 1000° C. Moreover, the above-described perovskite oxide may contain La and Sr coexisting in the A-site, or may contain Fe, Co, and Mn coexisting in the B-site. Such an air electrode 18 is capable of inducing electrode reaction.

Moreover, the air electrode 18 is designed to have an open porosity of greater than or equal to 20% for example, and preferably an open porosity of in the range of 30% to 50%. So long as the open porosity falls within the above prescribed ranges, the air electrode 18 is able to have a good gas-permeable nature.

Further, the air electrode 18 can be designed to have a thickness in the range of 30 μm to 100 μm for example, and this allows the air electrode 18 to have a good power-collecting capability.

The interconnector 14, which electrically connects the fuel electrode 17 of one fuel cell 13 and the air electrode 18 of the other fuel cell 13, has a two-layer structure composed of the metal layer 14a and the metallic glass layer 14b containing glass. As has already been described, instead of the metallic glass layer 14b, a layer made of a heretofore known electrically conductive oxide material can be used. Examples of the electrically conductive oxide material include lanthanum chromite-based oxide.

It is noted that the materials of construction of the constituent members of the fuel cell stack have been described hereinabove, but there is no limitation to the above-described materials. Moreover, while, in the above-described embodiment, the fuel cell 13 has a multilayer structure composed of an inner electrode which is the fuel electrode 17 and an outer electrode which is the air electrode 18, the fuel electrode and the air electrode can be positioned in the place of each other. That is, the fuel cell can be constructed by placing the air electrode 18, the solid electrolyte 19, and the fuel electrode 17 successively in the order named on the side surface of the support 11. In this case, an oxygen-containing gas such as air is passed into the first gas flow channel of the support 11, and a fuel gas such as hydrogen is passed over the surface of the fuel electrode 17 acting as the outer electrode.

Figure 4:
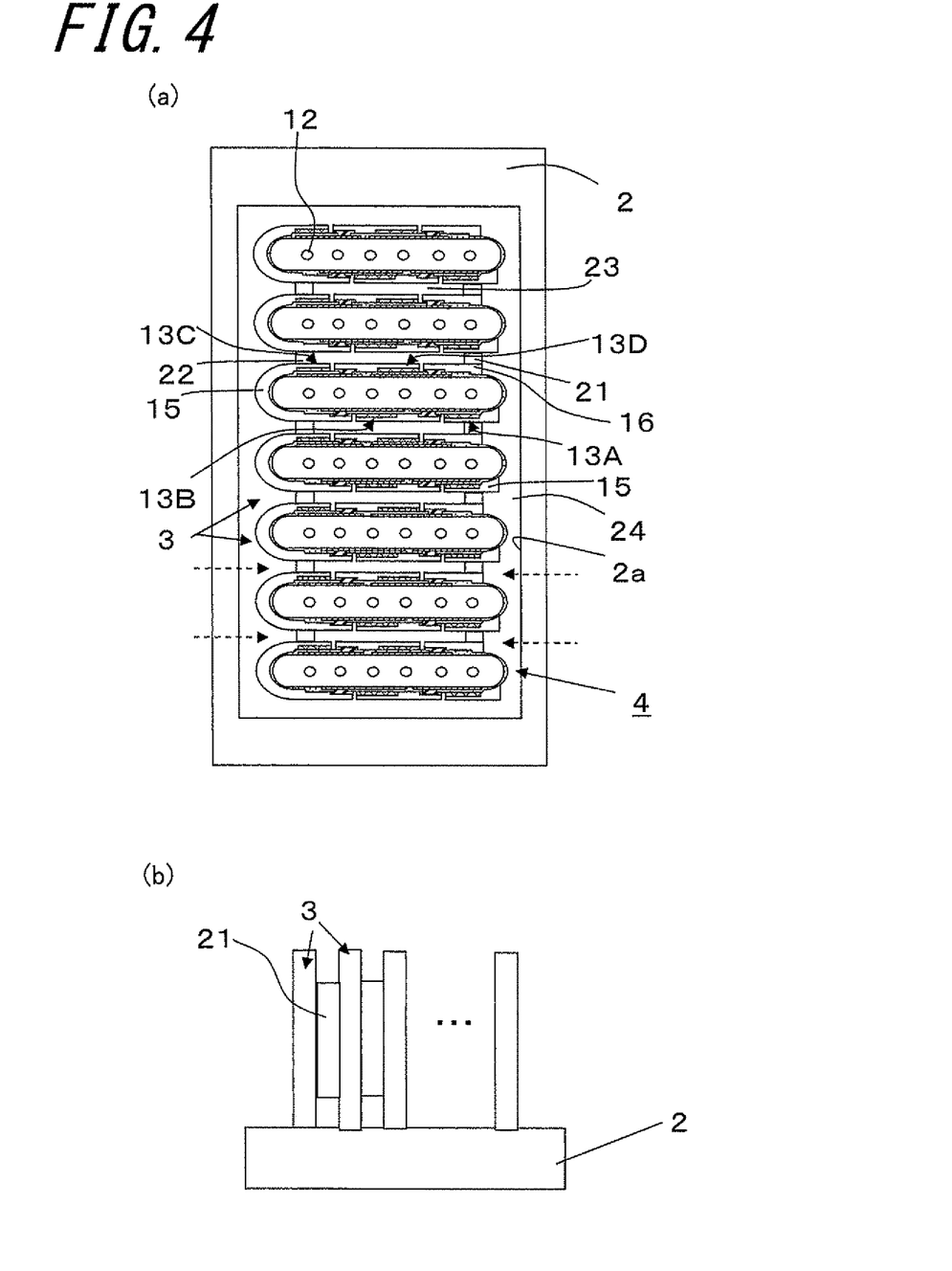
FIG. 4(a) is a sectional view of the fuel cell bundle of a first embodiment.
FIG. 4(b) is a side view of the fuel cell bundle shown in FIG. 4(a)

With reference to FIG. 4, a fuel cell bundle 4 connected with the above-described fuel cell stacks 3 according to a first embodiment will be described.

As shown in FIG. 4, the plurality of fuel cell stacks 3 are linearly arranged, with their widthwise edges kept aligned in the same direction, and an electrically conductive connecting member 21 is disposed along the lengthwise direction of the support 11 so as to lie between the right sides of, respectively, the adjacent fuel cell stacks 3. The connecting member 21 electrically connects the fuel cell stacks 3. Moreover, a second gas flow channel regulating member 22 is disposed along the lengthwise direction of the support 11 so as to lie between the left sides of, respectively, the adjacent fuel cell stacks 3.

In other words, a plurality of columnar fuel cell stacks 3 extending in the first direction are disposed in a row at predetermined spacing so that side surfaces thereof face each other, and the connecting member 21 for electrically connecting the fuel cells 13 of a fuel cell stack 3 with the fuel cells 13 of a fuel cell stack 3 adjacent thereto and the second gas flow channel regulating member 22 for forming a second gas flow channel 23 along the first gas flow channel 12 between itself and the connecting member 21 are provided in the lengthwise direction of the support 11 so as to lie between the adjacent fuel cell stacks 3.

A lower end of each of the fuel cell stacks 3 is fixedly inserted in a slim, rectangular parallelepiped fuel gas tank 2 extending in one direction. An upper wall of the fuel gas tank 2 is provided with a single opening 2a, and the fuel cell bundle 4 is disposed inside the opening 2a. The opening 2a is sealed with a sealing material 24 such as heat-resistant glass for gas-sealing effect.

An advisable method for securing the fuel cell bundle 4 to the fuel gas tank 2 involves a step of forming, at the upper wall of the fuel gas tank 2, a plurality of slits extending in a transverse direction of the tank, a step of inserting the fuel cell stack 3 in each of the slits, and a step of performing gas-sealing with glass or the like. As a glass material used for the sealing material 24, for example, heat-resistant glass such as borosilicate glass can be used.

Although not shown in the figure, the fuel gas tank 2 is connected with a fuel gas supply tube for feeding a fuel gas to the fuel gas tank 2, and the fuel gas provided from the fuel gas supply tube is fed to each of the fuel cell stacks 3. Then, as has already been described, the fuel gas passes through the first gas flow channel 12 provided inside the support 11, so that it flows through the interior of the fuel cell stack 3 in a direction from the lower end to the upper end of the fuel cell stack 3.

Where the flow of electricity within the fuel cell stack 3 is concerned, an electric current generated by a fuel cell 13A flows into a fuel cell 13B through the interconnector 14 and the cell connecting member 15. The current which flowed into the fuel cell 13B and a current generated by the fuel cell 13B flow into a fuel cell 13C through the interconnector 14 and the cell connecting member 15. Likewise, the current which flowed into the fuel cell 13C and a current generated by the fuel cell 13C flow into a fuel cell 13D through the interconnector 14 and the cell connecting member 15, so that the current runs through the fuel cell stack 3. After that, the current which flowed into the fuel cell 13D and a current generated by the fuel cell 13D flow into a fuel cell 13 of the upper-located adjacent fuel cell stack 3 through the cell stack connecting member 16 and the connecting member 21. Thus, the fuel cell bundle 4 is constructed by electrically connecting the fuel cell stacks 3 in series to each other.

Accordingly, the current running through the fuel cell stack 3 flows in a direction perpendicular to the lengthwise direction of the support 11, and, in this case, even if the fuel cell 13 situated in that part of the fuel cell stack 3 which is located on the downstream side in the direction of fuel gas flow suffers from quality degradation due to fuel depletion in the fuel cell 13, by virtue of the fuel cell 13 located on the upstream side in the direction of fuel gas flow, in contrast to a conventional fuel cell of horizontal-stripe pattern, the deterioration of the fuel cell bundle 4 can be minimized, wherefore the power-generation efficiency of the fuel cell bundle 4 can be enhanced.

Moreover, since the fuel cell stacks 3 are arranged linearly rather than being arranged in a staggered configuration, it is possible to lessen the widening of the fuel cell bundle 4 in the widthwise direction of the support 11, and thereby make the fuel cell bundle 4 compact.

As has already been described, upon the feeding of air (oxygen-containing gas) to the surface of the fuel cell stack 3, the fuel cell 13 becomes able to effect power generation. Therefore, by providing an air introduction member (not shown) for introducing air on the lateral sides of the fuel cell bundle 4 as indicated by broken lines in FIG. 4, it is possible to feed air in between the fuel cell stacks 3. In this case, in order to feed air to the fuel cell 13 situated in that part of the fuel cell stack 3 which is located on the upstream side in the direction of fuel gas flow, it is advisable to dispose the outlet of the air introduction member in a position below the fuel cell stack 3, where neither of the connecting member 21 and the second gas flow channel regulating member 22 exists. This allows the air fed to the lower part of the fuel cell stack 3 to flow upward between the adjacent the fuel cell stacks 3.

That is, in the fuel cell bundle 4, since the connecting member 21 is disposed along the lengthwise direction of the support 11 so as to lie between the right sides of the adjacent fuel cell stacks 3 and the second gas flow channel regulating member 22 is disposed along the lengthwise direction of the support 11 so as to lie between the left sides of the adjacent fuel cell stacks 3, it follows that the space surrounded by the fuel cell stacks 3, the connecting member 21, and the second gas flow channel regulating member 22 serves as the second gas flow channel 23 that will serve as an oxygen-containing gas flow channel in the case of effecting a supply of oxygen-containing gas (also referred to as air).

In this way, since the second gas flow channel 23 is formed between the fuel cell stacks 3 by the arrangement of the fuel cell stack 3, the connecting member 21, and the second gas flow channel regulating member 22, it is possible to reduce the possibility that the air, which has once been fed in between the fuel cell stacks 3 from between the upper surface of the fuel gas tank 2 and the connecting member 21 as well as the second gas flow channel regulating member 22, flows to the outside of the fuel cell stack 3, and thereby achieve an efficient supply of an adequate quantity of air to the fuel cell 13.

Moreover, in the conventional design where fuel cell stacks 3 are arranged in a staggered configuration, there is a need to feed a large quantity of oxygen-containing gas to a wide space between the right-hand and left-hand fuel cell stacks 3, which leads to difficulty in delivering an oxygen-containing gas evenly with high efficiency, whereas, in this embodiment, as is the case with the fuel cell bundle 4, since the fuel cell stacks 3 are linearly arranged and the space between the fuel cell stacks is utilized as the second gas flow channel 23, it is possible to feed an oxygen-containing gas to each of the fuel cell stacks 3 substantially equally with high efficiency, and thereby increase the rate of air utilization. Note that the fuel cell stacks 3 may be curvilinearly arranged, with their widthwise edges kept aligned.

Further, in a fuel cell apparatus designed so that a fuel gas left unused in power generation and air left unused in power generation are burned at the side of the upper end of the fuel cell stack 3, even if the amount of a fuel gas and air to be fed to the fuel cell bundle 4 is small, it is possible to feed air to the upper end of the fuel cell stack 3 with high efficiency, and thereby reduce the possibility of occurrence of accidental fire in the fuel cell apparatus.

There is no particular limitation to the material used for the connecting member 21 so long as the connecting member 21 can be made to electrically connect the fuel cell stacks 3, and therefore, for example, the connecting member 21 may be made of the same material as that used for the cell connecting member 15.

It is noted that the application of an electrically conductive adhesive, for example a paste containing a precious metal such as Ag or Pt to the juncture of the cell stack connecting member 16 and the connecting member 21 makes it possible to improve the reliability of connection. Moreover, a paste containing Ni metal can be taken up as a preferred example of the electrically conductive adhesive from an economical standpoint.

It is preferable that the material used for the second gas flow channel regulating member 22 has insulation property so as to be conducive to defining the second gas flow channel 23. For example, alumina or a heat insulator used in a fuel cell apparatus can be used.

The length of the connecting member 21 and the length of the second gas flow channel regulating member 22 can be adjusted to be equal to or greater than the length in the lengthwise direction of the fuel cell 13. This makes it possible to form the second gas flow channel 23 so that air can be fed sufficiently to the fuel cell 13. Note that, by adjusting the length of in the lengthwise direction of the connecting member 21 as well as the second gas flow channel regulating member 22 to be equal to the length of the long side of the fuel cell 13, it is possible to suppress leakage of an oxygen-containing gas effectively while minimizing the cost of forming the connecting member 21 and the second gas flow channel regulating member 22.

While the connecting member 21, as well as the second gas flow channel regulating member 22, and the fuel cell stack 3 can be connected to each other properly by ceramics, glass, or the like material, in the joining of the connecting member 21, it is necessary to use an electrically conductive material. By bonding the connecting member 21 and the second gas flow channel regulating member 22 to the fuel cell stack 3 tightly and closely without air leakage, a reaction gas can be fed to the fuel cell 13 to a larger extent. Note that the second gas flow channel regulating member 22 does not necessarily have to be bonded to the fuel cell stack 3.

Moreover, the connecting member 21 or the second gas flow channel regulating member 22 may be formed by a member which is divided into a plurality of components in the lengthwise direction of the support 11. That is, in this case, the plurality of components arranged at predetermined spacing in the lengthwise direction of the support 11 constitute the connecting member 21 or the second gas flow channel regulating member 22. Thereby, at the time of connection with the fuel cell stack 3, a stress which is developed between the connecting member 21 or the second gas flow channel regulating member 22 and the fuel cell stack 3 can be reduced.

Also, the connecting member 21 or the second gas flow channel regulating member 22 may be formed of a single member disposed along the lengthwise direction. In this case, leakage of an oxygen-containing gas flowing through the second gas flow channel 23 from between the fuel cell stacks 3 is even less likely to occur.

Figure 5:
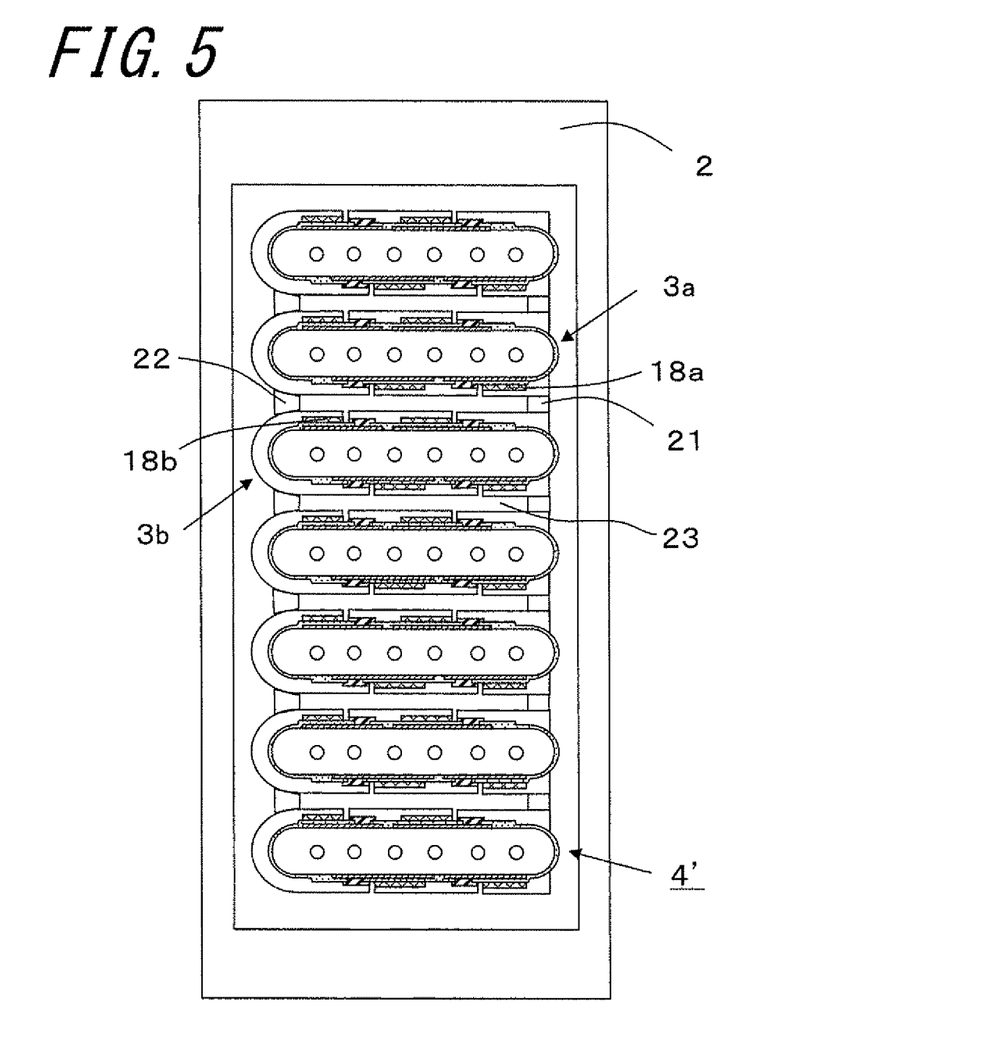
FIG. 5 is a sectional view of the fuel cell bundle of a second embodiment in which a connecting member and a second gas flow channel regulating member are each located outward relative to the endmost fuel cell.

With reference to FIG. 5, a fuel cell bundle 4' according to a second embodiment will be described. Note that, in FIG. 5, although some constituent components are shown in section, a hatching, etc. may be omitted.

In the fuel cell bundle 4', the second gas flow channel regulating member 22 and the connecting member 21 are each located outward relative to the endmost fuel cell 13 of a fuel cell stack 3a, 3b. Other components of the fuel cell bundle 4' are identical to those of the fuel cell bundle 4 shown in FIG. 4, and such constituent components as are common to those in FIG. 4 are denoted by the same reference numerals.

More specifically, in the fuel cell bundle 4', the second gas flow channel regulating member 22 is disposed to the left of the fuel cell stack 3b in the widthwise direction so as to be located leftward relative to an air electrode 18b situated below the cell connecting member 15 of the fuel cell stack 3b, and the connecting member 21 is disposed to the right of the fuel cell stack 3a in the widthwise direction so as to be located rightward relative to an air electrode 18a situated below the cell stack connecting member 16 of the fuel cell stack 3a.

In the fuel cell bundle 4' of the second embodiment, by virtue of the above-described structure, the entire area of the air electrode 18a, 18b can be disposed within the second gas flow channel 23, wherefore air can be fed to the air electrode 18 to a larger extent. In this case, the connecting member 21 and the second gas flow channel regulating member 22 can be rendered a dense body. By rendering the connecting member 21 a dense body, a reduction in electrical resistance can be achieved.

A plurality of fuel cell bundles 4, 4' are assembled into a power-generating unit. The power-generating unit is furnished with an electrode for taking electric power generated by the power-generating unit out of a fuel cell device, and is then contained in a housing, thereby producing a fuel cell device.

When the fuel cell device is in use, a hydrogen-containing fuel gas is introduced into the fuel gas tank through an introduction tube. On the other hand, oxygen-containing air is directed to the surface of the fuel cell bundle 4, 4'. Upon the heating of the fuel cells 13 to a predetermined temperature, the series-connected fuel cells 13 are allowed to effect power generation with high efficiency. Used fuel gas and oxygen-containing gas are discharged out of the housing.

The invention is not limited to the embodiments as above described. For example, in designing the fuel cell as shown in FIG. 1, the shape of a hollow cylinder may be adopted instead of the hollow plate shape. Moreover, although there are provided two fuel cells at one of the side surfaces of the hollow plate-shaped support 11 and two fuel cells at the other side surface, or a total of four fuel cells in all, the number of the fuel cells is not so limited.

Figure 6:
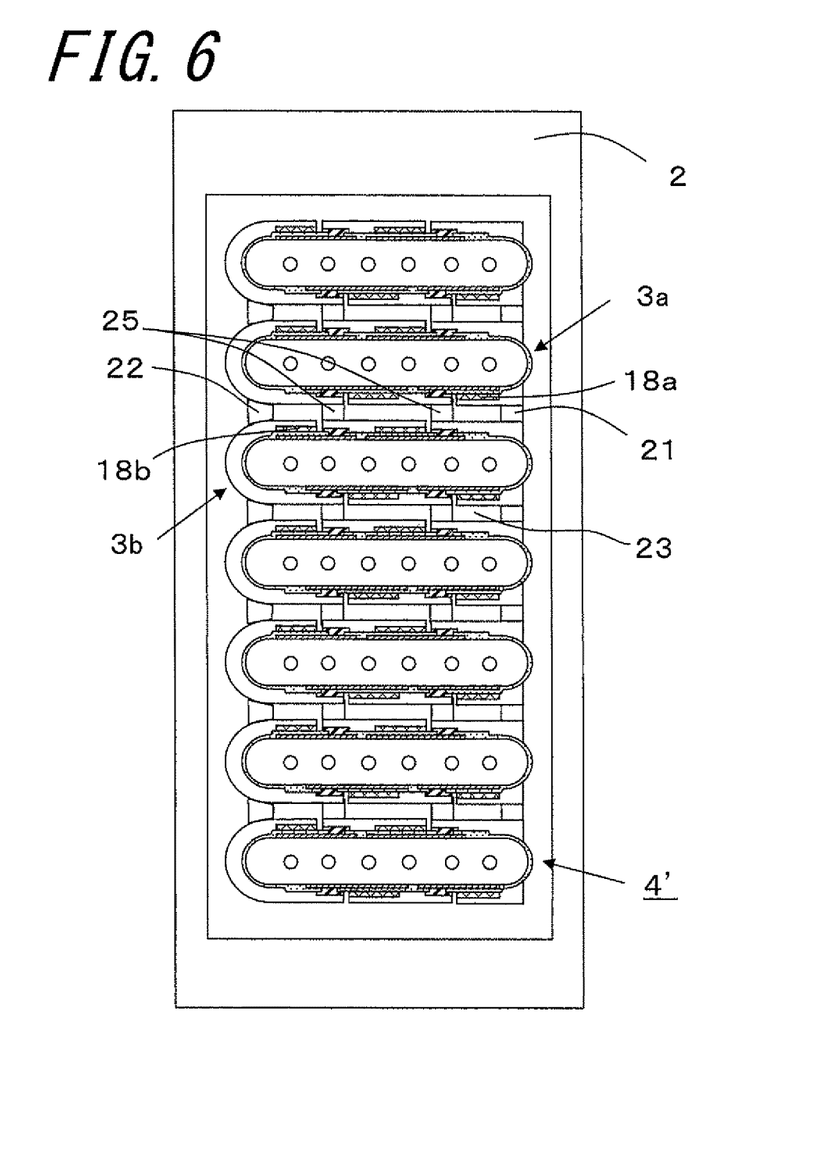
FIG. 6 is a sectional view of a third embodiment in which spacers are disposed between the connecting member and the second gas flow channel regulating member.

In FIG. 6, a fuel cell bundle according to a third embodiment is shown. In the third embodiment, two spacers 25 are arranged in the lengthwise direction of the support 11 so as to lie between the adjacent fuel cell stacks 3, as well as to lie between the connecting member 21 and the second gas flow channel regulating member 22. These spacers 25 have insulation property, and the spacer 25 and the fuel cell stack 3 are bonded to each other by an adhesive.

With repeated starting and halting of power-generating operation, the fuel cell stack 3 undergoes deformation, and, even if the fuel cell stacks 3 are connected together by the connecting member 21 and the second gas flow channel regulating member 22, the juncture of them suffers from degradation over time with the consequence that the fuel cell stacks 3 are prone to separation.

In this regard, by connecting the adjacent fuel cell stacks 3 together in the presence of the spacers 25 arranged in the lengthwise direction of the support 11 so as to lie between the connecting member 21 and the second gas flow channel regulating member 22, it is possible to secure a spacing between the adjacent fuel cell stacks 3 without fail, as well as to ensure connection between the fuel cell stacks 3 via the second gas flow channel regulating member 22, the spacers 25, and the connecting member 21, and therefore, with repeated starting and halting of power-generating operation, the fuel cell stacks 3 can be kept in a firmly-bonded condition for a longer period of time.

Figure 7:
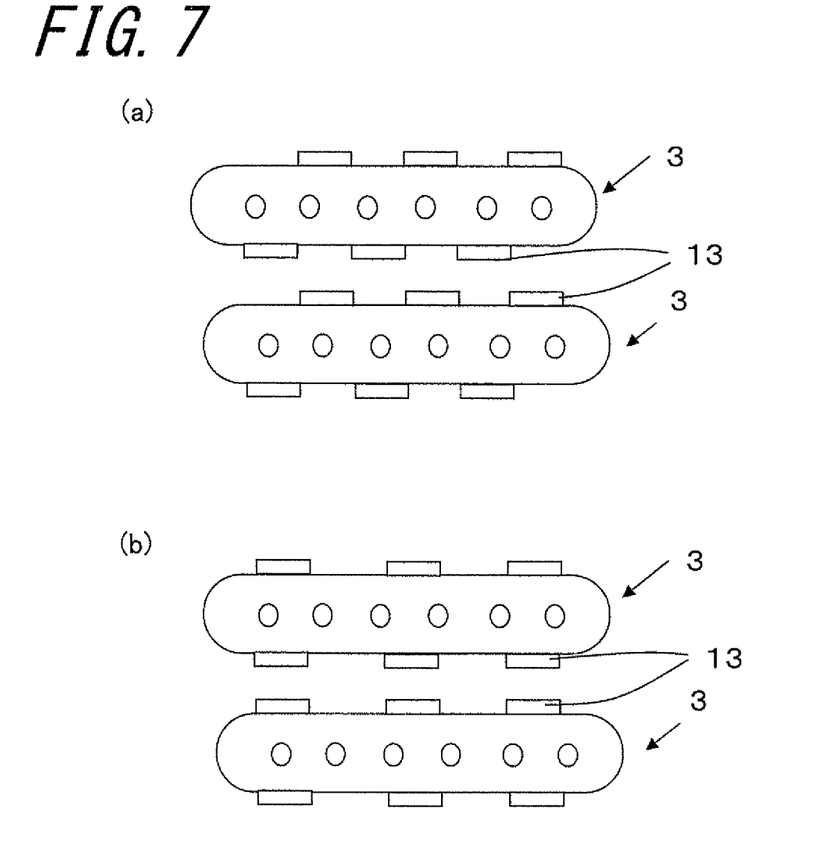

In FIG. 7(a), a fuel cell bundle according to a fourth embodiment is shown. In the fourth embodiment, the fuel cells 13 are arranged on the confronting side surfaces of the adjacent first fuel cell stack 3 and second fuel cell stack 3 so that the fuel cells 13 are in offset relation to one another. Note that, in FIG. 7, the fuel cell stacks are illustrated schematically.

That is, in the adjacent fuel cell stacks 3, each of the fuel cells 13 of the first fuel cell stack 3 is disposed so as to lie between the fuel cells 13 formed on the side surface facing the first fuel cell stack 3 of the second fuel cell stack 3.

In such a fuel cell bundle, since the fuel cell 13 of the first fuel cell stack 3 is located between the fuel cells 13 of the second fuel cell stack 3, it follows that the area of space is substantially uniform throughout the second gas flow channel 23 between the first fuel cell stack 3 and the second fuel cell stack 3, and this makes it possible to feed air to the fuel cells 13 formed on the confronting side surfaces of the adjacent fuel cell stacks 3 substantially equally, and thereby render the power-generating performance capabilities of the plurality of fuel cells 13 uniform in the fuel cell stacks 3, with a consequent reduction in the possibility of degradation of part of the fuel cells 13.

On the other hand, as shown in FIG. 7(b), where the fuel cell 13 of the first fuel cell stack 3 is opposed to the fuel cell 13 of the second fuel cell stack 3 in between the first and second fuel cell stacks 3, since the fuel cells 13 formed on the confronting surfaces of the first and second fuel cell stacks 3 are arranged in a face-to-face manner, it follows that, on the confronting surfaces of the first and second fuel cell stacks 3, fuel cell 13-free portions are also arranged in a face-to-face manner in the second gas flow channel 23, thereby defining a wide space, and air flows through this wide space. In this case, the rate of air utilization tends to be decreased, yet the opposed fuel cells 13 heat each other under reaction heat, which results in improvement in power-generating performance. Note that the cell connecting member 15 is given a shape determined in consideration of the outer contour of the fuel cell 13, wherefore there arises an appreciable difference in height between the fuel cell 13-bearing part and the fuel cell 13-free part thereof.

Figure 8:
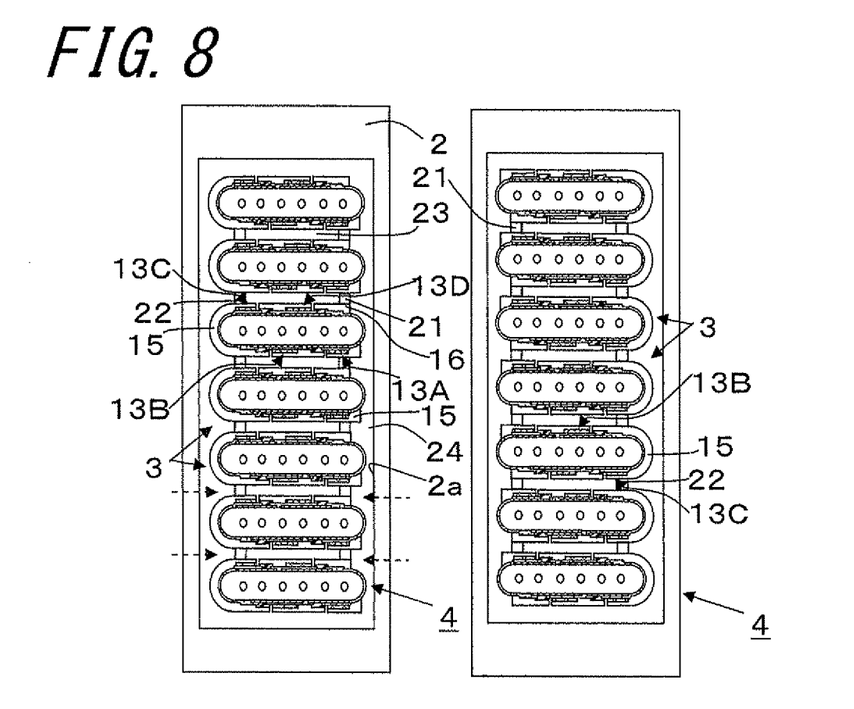
FIG. 8 is a sectional view showing a condition where two fuel cell bundles are juxtaposed so that their connecting members are located inwardly.

In FIG. 8, an embodiment of a fuel cell module having two fuel cell bundles is shown. In this embodiment, the two fuel cell bundles as shown in FIG. 4 are juxtaposed inside a housing. Note that the illustration of the housing is omitted.

In this fuel cell module, two fuel cell bundles 4 are juxtaposed so that their connecting members 21 are located inwardly. In other words, the two fuel cell bundles 4 are juxtaposed so that the directions of arrangement of the fuel cell stacks 3 thereof are parallel, and, the fuel cell bundles 4 are arranged with their connecting members 21 located inwardly and their second gas flow channel regulating members 22 located outwardly.

Or to put it another way, the fuel cell stack 3 has its one side made to bear the cell connecting member 15 extending from one side surface (lower surface) to the other side surface (upper surface) thereof, and has its other side made to be free of the cell connecting member 15. In FIG. 8, in the right-hand fuel cell bundle 4, the cell connecting member 15 for the connection between the fuel cell 13 at the top side and the fuel cell 13 at the back side is formed on the right side of the fuel cell stack 3, whereas, in the left-hand fuel cell bundle 4, the cell connecting member 15 for connecting together the fuel cells 13 at the front and back sides is formed on the left side of the fuel cell stack 3.

In such a fuel cell module, although the cell connecting member 15 for connecting together the cells at the front and back sides, being large in length, gives off a larger amount of heat, the cell connecting member 15 for connecting together the fuel cells 13 at the front and back sides is located outwardly in each of the two juxtaposed fuel cell bundles, wherefore variation in temperature distribution in the housing can be reduced.

REFERENCE SIGNS LIST

2: Fuel gas tank
3: Fuel cell stack
4, 4': Fuel cell bundle
11: Support
12: First gas flow channel
13, 13A, 13B, 13C, 13D: Fuel cell
14: Interconnector
15: Cell connecting member
16: Cell stack connecting member
17: Fuel electrode
18: Air electrode
19: Solid electrolyte
21: Connecting member
22: Second gas flow channel regulating member
23: Second gas flow channel
25: Spacer

The invention claimed is:

1. A fuel cell bundle, comprising:
a plurality of columnar fuel cell stacks extending in a first direction that are disposed in a row at a spacing so that side surfaces thereof face each other,
the fuel cell stacks each having a first gas flow channel along the first direction and also having a plurality of series-connected fuel cells disposed side-by-side in a second direction intersected by the first direction;
a connecting member for electrically connecting series-connected fuel cells of a fuel cell stack with series-connected fuel cells of a fuel cell stack adjacent thereto; and
a second gas flow channel regulating member for forming a second gas flow channel along the first gas flow channel between itself and the connecting member,
the connecting member and the second gas flow channel regulating member being disposed between the adjacent fuel cell stacks,
the connecting member being spaced from lower ends of the fuel cell stacks.

2. The fuel cell bundle according to claim 1,
wherein the second gas flow channel regulating member has an insulation property, and
the second gas flow channel regulating member and the connecting member are each located outward relative to an endmost fuel cell of the fuel cell stack in the second direction.

3. The fuel cell bundle according to claim 1,
wherein the connecting member is made of a plurality of components into which a member is divided in the first direction.

4. The fuel cell bundle according to claim 1,
wherein the connecting member is made of a single member disposed along the first direction.

5. The fuel cell bundle according to claim 1,
wherein the second gas flow channel regulating member is made of a plurality of components into which a member is divided in the first direction.

6. The fuel cell bundle according to claim 1,
wherein the second gas flow channel regulating member is made of a single member disposed along the first direction.

7. The fuel cell bundle according to claim 1,
wherein a spacer is disposed between the adjacent fuel cell stacks so as to lie between the connecting member and the second gas flow channel regulating member.

8. A fuel cell module, comprising:
a housing;
the fuel cell bundle according to claim 1, contained in the housing.

9. The fuel cell module according to claim 8,
wherein two fuel cell bundles are juxtaposed so that their connecting members are located inwardly.

10. The fuel cell bundle according to claim 1,
wherein the fuel cell stacks comprise a first fuel cell stack and a second fuel cell stack,
the fuel cells formed on the side surface of the first fuel cell stack are disposed in the second direction in a staggered manner with respect to the fuel cells formed on the side surface of the second fuel cell stack, the side surface of the second fuel cell stack facing the side surface of the first fuel cell stack.

* * * * *